United States Patent
Chen et al.

(10) Patent No.: US 8,438,351 B2
(45) Date of Patent: May 7, 2013

(54) BINARY LEVEL UPDATE OF COMPRESSED READ-ONLY FILE SYSTEMS

(75) Inventors: Samson Chen, Irvine, CA (US); Marko Slyz, San Diego, CA (US); LaShawn McGhee, San Diego, CA (US); Giovanni Motta, San Diego, CA (US); Brian O'Neill, San Juan Capistrano, CA (US); Bill Liu, Beijing (CN); Li Wen, Beijing (CN); Ben-Tong Sun, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 12/663,428

(22) PCT Filed: Jun. 6, 2008
(Under 37 CFR 1.47)

(86) PCT No.: PCT/US2008/066167
§ 371 (c)(1),
(2), (4) Date: Jan. 3, 2011

(87) PCT Pub. No.: WO2008/154411
PCT Pub. Date: Dec. 18, 2008

(65) Prior Publication Data
US 2011/0107046 A1    May 5, 2011

Related U.S. Application Data

(60) Provisional application No. 60/933,608, filed on Jun. 6, 2007.

(51) Int. Cl.
*G06F 13/00*    (2006.01)

(52) U.S. Cl.
USPC ............. 711/162; 707/693; 711/E12.084

(58) Field of Classification Search ............ None
See application file for complete search history.

(56) References Cited

U.S. PATENT DOCUMENTS

| | | | | |
|---|---|---|---|---|
| 6,035,068 A | * | 3/2000 | Imai | 382/232 |
| 2007/0157001 A1 | * | 7/2007 | Ritzau | 711/170 |
| 2010/0325523 A1 | * | 12/2010 | Slyz et al. | 714/773 |

OTHER PUBLICATIONS

Shapira, Dana & Storer, James A., "In Place Differential File Compression"; The Author 2005, Published by Oxford University Press on behalf of the British Computer Society; Advance Access published on Aug. 26, 2005; The Computer Journal vol. 48, No. 6, 2005, pp. 677-691.

Burns, Randal C. & Long, Darrell D.E., "In-Place Reconstruction of Delta Compressed Files"; Dept of Computer Science, IBM Almaden Research Center, randal@almaden.ibm.com; Dept of Computer Science, Univ of California, Santa Cruz, darrell@cs.ucsc.edu; 12 pgs.

Anonymous, Wikipedia, the free encyclopedia, "Binary delta compression"; XP-002532765; Internet Article; May 9, 2007; http://enwikipedia.org/w/Index.php?title=Binary_delta_compression&oldid=129402357; 1 pg.

International Search Report and Written Opinion of the International Searching Authority; dated Jul. 15, 2009.

* cited by examiner

*Primary Examiner* — Edward Dudek, Jr.
*Assistant Examiner* — Sean D Rossiter

(57) ABSTRACT

A method and computer-readable memory device that enable processing of a first memory image comprising a plurality of compressed sub-blocks and uncompressed sub-blocks to produce a second memory image comprising contents of the first memory image arranged as a plurality of memory blocks. The memory blocks of the second memory image may be independently decompressible, to enable more efficient updating of an electronic device.

10 Claims, 9 Drawing Sheets

BINARY LEVEL UPDATE OF COMPRESSED READ-ONLY FILE SYSTEMS

RELATED APPLICATIONS

The present application makes reference to, claims priority to, and claims benefit of U.S. Patent Application Ser. No. 60/933,608, entitled "BINARY-LEVEL UPDATE OF COMPRESSED READ-ONLY FILE SYSTEMS", filed Jun. 6, 2007, the complete subject matter of which is hereby incorporated herein, in its entirety.

BACKGROUND OF THE INVENTION

Embedded electronic devices sometimes have file systems that are stored in flash-type non-volatile memory. It can be useful to update the information in these file systems to, for example, fix bugs in code stored in the memory.

An original version of a file system may be referred to as V1, and the updated version as V2. In some cases, much of V2 is similar or identical to V1. In this situation, an update may be done by sending just the information that changed between V1 and V2. A tool that may be referred to as a "generator" may accept V1 and V2 as inputs, and may produce information used in the electronic device to covert or transform version V1 into version V2. This information may be stored in a file referred to herein as an update package (UP), which may be sent to all of the embedded electronic devices that are to be updated. Each of these electronic devices contains a program referred to herein as an "update agent" (UA), which applies the UP to version V1, thus converting V1 to produce version V2.

Further limitations and disadvantages of conventional and traditional approaches will become apparent to one of skill in the art, through comparison of such systems with a representative embodiment of the present invention as set forth in the remainder of the present application with reference to the drawings.

DETAILED DESCRIPTION OF THE INVENTION

Figure 1A:
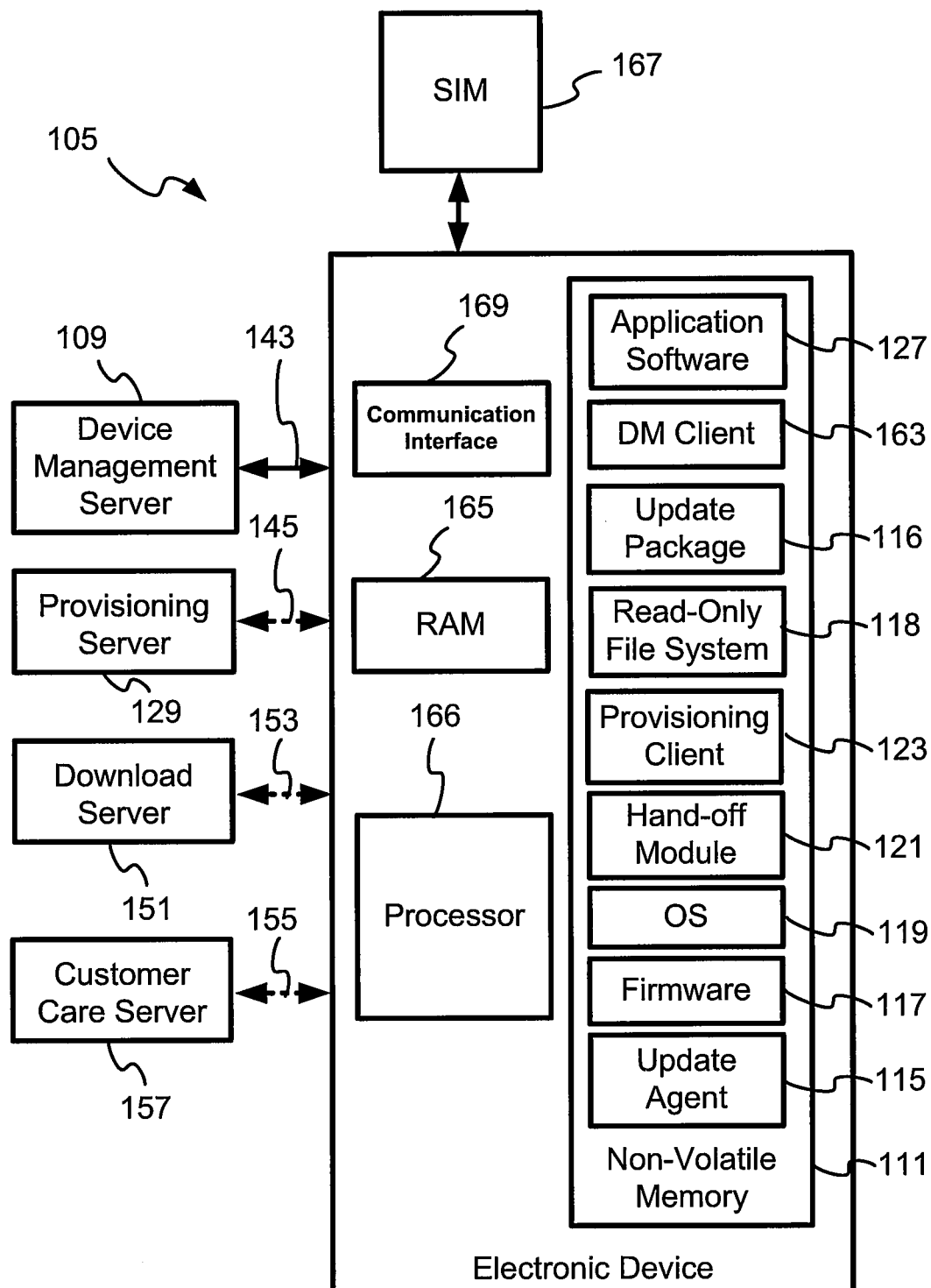
FIG. 1A is a perspective block diagram of an exemplary network that supports remote update of non-volatile memory of an electronic device such as, for example, a mobile handset or personal digital assistant, in accordance with a representative embodiment of the present invention.

Aspects of the present invention relate generally to the updating of memory in electronic devices, and more specifically, to methods and systems supporting processing of updates for firmware, software, configuration parameters and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teachings contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11a/b/g/n compatible networks, the short range wireless technology known as Bluetooth, and similar types of communication links.

In a representative embodiment of the present invention, information for updating memory in an electronic device such as those described above is communicated using, for example, an update package comprising a set of instructions executable by firmware and/or software in the electronic device to transform or convert an existing version of software, firmware, and/or data in the electronic device into a new or updated version of the software, firmware, and/or data. In some representative embodiments, such an update package also contains metadata related to the update.

A representative embodiment of the present invention uses a method that may be referred to as "delta compression" to perform an update. The UP comprises a sequence of instructions generated by a "generator" that are used by an "update agent" in an electronic device to recreate an updated version V2 by converting or transforming version V1. A number of different types of instructions may be contained in the update package. One instruction type is the "copy" instruction, which moves identical bytes from version V1 into version V2. For example, if a sequence of 10,000 consecutive bytes is common to both version V1 and version V2, then the generator can issue a single copy instruction, just a few bytes long, to move all 10,000 bytes into version V2. Other types of instructions may be used to explicitly list bytes to insert into version V2. The generator can use these other types of instructions for material that cannot be efficiently encoded using the copy command. For example, short sequences of bytes may be more efficiently encoded by sending them verbatim because of the overhead involved with the use of the copy instruction.

Flash-type non-volatile memory (where V1, and later V2, may be stored) is organized into blocks, which may be the smallest writable units of data. For some types of flash memory, blocks are also the smallest readable unit of data.

In a representative embodiment of the present invention, the generator determines an order in which to update flash memory blocks. In some representative embodiments, the generator determines an order in which a flash block is updated after the material in it is no longer needed to create other portions of version V2. Otherwise, updating a part of flash memory containing version V1 can cause content needed in the reconstruction of other parts of version V2 to no longer be available. An element that referred to herein as an "order manager" can be used to determine an optimal order for a particular version V1 and version V2.

Small changes in executable code (that may be referred to herein as "primary changes") may propagate to cause many other changes (that may be referred to herein as "secondary changes"). For example, if there are program jumps from locations in the first portion to a second portion of a software/firmware function in version V1, and the version of that software/firmware function in V2 has additional bytes inserted between its first and second portions, then most or all of the offsets of the jumps in the second portion change. This can result in many changes/differences between the bytes of version V1 and version V2. In some representative embodiments of the present invention, preprocessing is employed to describe all of those changed bytes in a compact way.

One function of the generator is to produce small UPs, because transmission time/bandwidth may be limited, and an end-user may be waiting for an update to complete. The generator and update agent (UA) together support fault-tolerance, so that the electronic device recovers gracefully and without corruption of memory contents if the update process is interrupted.

For example, if the battery of an electronic device is exhausted while the UA is writing version V2 to flash memory, then the part of version V1 that the UA overwrote will no longer be available when the user recharges the battery and resumes the update process. Because this part of version V1 may have been used by the UA to create version V2 from version V1 and the UP, in the case of a read-only file system, there may be no way in the prior art to continue the update process. One example of a read-only file system is "squashfs" created by Phillip Lougher (see http://squashfs.sourceforge.net/). The electronic device may be left in an unusable state. However, a generator in accordance with a representative embodiment of the present invention compensates for such a lack of availability. For example, in a representative embodiment of the present invention, the generator detects that a part of version V1 is not available at a particular time during the update process, and the order manager may compensate by not referencing the unavailable material.

FIG. 1A is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 can support a number of features and/or applications that may contain software/firmware errors that need to be corrected, or that may provide additional features/benefits by updating the software/firmware. In one representative embodiment, the electronic device 107 can be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. In a representative embodiment of the present invention, such update packages comprise instructions executed/interpreted by software/firmware code in the electronic device 107 that convert or transform a first version of software/firmware to a second version of software/firmware, in the electronic device 107. In some representative embodiments, the update package(s) also contain metadata and checksum information.

As shown in the illustration of FIG. 1A, the network 105 in one representative embodiment of the present invention comprises the electronic device 107, a device management (DM) server 109, a provisioning server 129, a customer care server 157, and a download server 151. Although not illustrated in FIG. 1A, a representative embodiment of the present invention may also comprise other application servers such as, for example, a diagnostics server, and a self-care website/portal. The electronic device 107 of FIG. 1A is able to communicate with the DM server 109, the download server 151, the customer care server 157, and the provisioning server 129 via communication interface 169, and communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. In some representative embodiments, the communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities. While not explicitly shown in FIG. 1A, one of ordinary skill in the relevant art will recognize that communication interface 169 is compatible with the selected type(s) of communication paths 143, 153, 155, 145.

As illustrated in FIG. 1A, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a read-only file system (ROFS) 118, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The electronic device 107 may also comprise interface circuitry (not shown) to enable operable connection of a subscriber identity module (SIM) card 167, that may be employed in accordance with aspects of the present invention described later in this document.

In a representative embodiment of the present invention, an electronic device such as, for example, the electronic device 107 of FIG. 1A processes an update package (e.g., the update package/update package array 116) delivered by a remote server such as, for example, the download server 151, to update firmware/software, data and configuration information in memory of the electronic device 107. Such an update package comprises update information including, for example, metadata describing an update, checksums, and instructions executable by one or more update agents such as, for example, the update agent 115 of FIG. 1A. In a representative embodiment of the present invention, the update agent 115 processes a set of executable instructions, which are used as a compact means to encode differences between an existing/first version and updated/second version of firmware, software, data, and/or configuration parameters in the electronic device 107. The executable instructions may be assembled into one or more update packages to be transmitted to an electronic device for use in updating memory of the electronic device. In a representative embodiment of the present invention, one or more update agent(s) 115 in the electronic device process respective portions of the executable instructions from an update package to convert/transform corresponding portions of an existing/first version of code in memory of the electronic device 107 to portions of an updated/second version of code. In some embodiments, the electronic device 107 receives provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. In such representative embodiments, the DM client 163 of the electronic device 107 interacts with the DM server 109, the diagnostic client, and/or the traps client, to receive DM commands from the DM server 109 and to implement them in the electronic device 107. The download server 151 is employed to download firmware and software updates (e.g., update information in the form of, for example, update packages). The download server 151 may also be used to download new firmware/software such as, for example, the diagnostics client mentioned above, which can then be installed and activated in the electronic device 107.

As described briefly above, an electronic device in accordance with a representative embodiment of the present invention (e.g., electronic device 107) receives update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. In such a representative embodiment, each of the update packages received can be processed in the electronic device by an appropriate one of the update agent(s) 115 to update an associated type of information in the memory of the electronic device 107.

Ordinary file systems have the ability to create, modify, and delete individual files. This makes updating files relatively straightforward, since the UA can modify one file at a time, without regard for the other files. Some file systems, however, are "read-only" files systems (ROFS), meaning that they do not easily allow for individual files to be added, deleted, or modified. These file systems can be useful for storing files (e.g., system files in an OS) that don't need to be updated often. Furthermore, read-only file systems are often organized in the most compact way, with the use of simplified data structures and compression. For example, there may be no way to add 100 bytes to the end a file without moving the files that follow it.

Figure 1B:
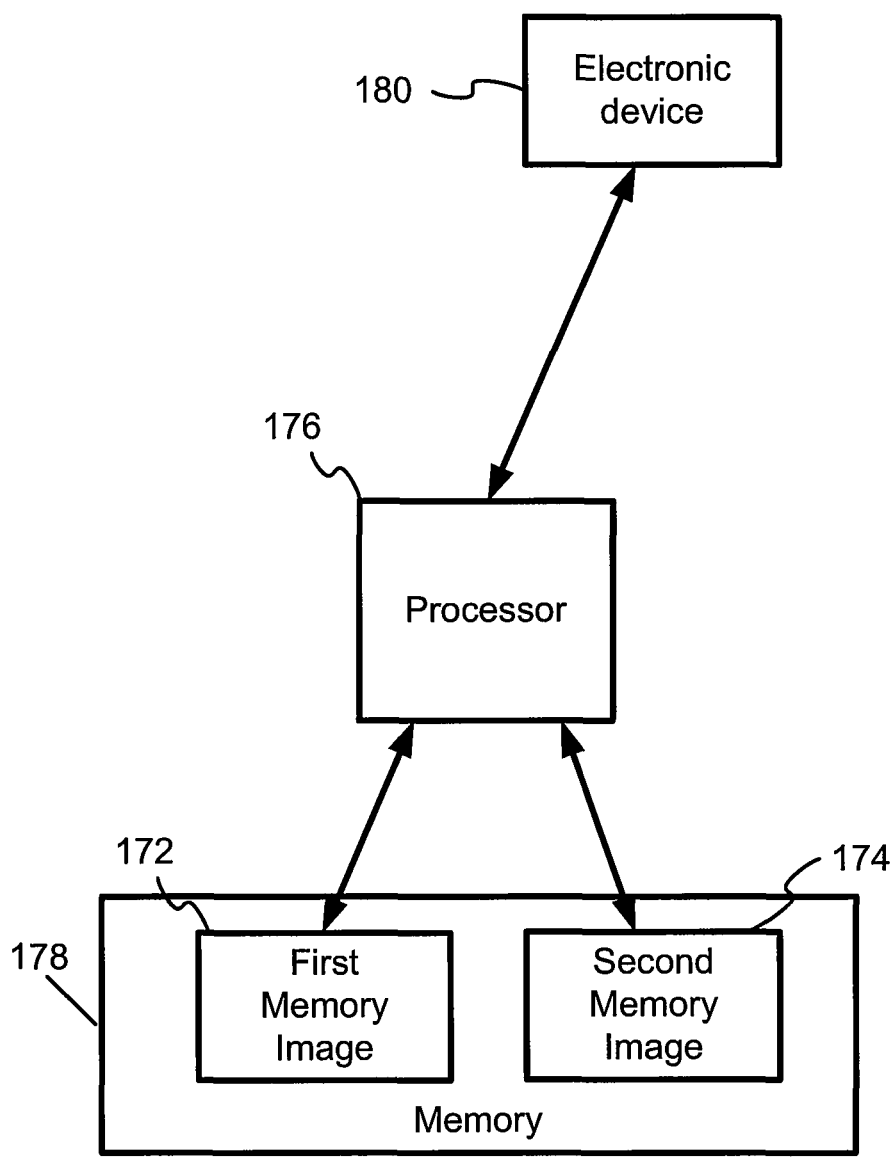
FIG. 1B is a perspective block diagram of an exemplary computer system comprising a processor that accesses a first memory image to produce a second memory image arranged as a plurality of independently decompressible memory blocks for storage in the memory of an electronic device that may correspond to, for example, the electronic device of FIG. 1A, in accordance with a representative embodiment of the present invention.

FIG. 1B is a perspective block diagram of an exemplary computer system 170 comprising a processor 176 that accesses a first memory image 172 to produce a second memory image 174 arranged as a plurality of independently decompressible memory blocks for storage in the memory of an electronic device 180 that may correspond to, for example, the electronic device 107 of FIG. 1A, in accordance with a representative embodiment of the present invention. The illustration of FIG. 1B shows a first memory image 172 that may be a memory image produced by, for example, a manufacturer of the electronic device 107, or a third party software developer. The first memory image 72 may contain firmware and/or a read-only file system. In one representative embodiment of the present invention, the first memory image 172 is a copy of non-volatile memory of an electronic device such as, for example, the NVM 111 of the electronic device 107 of FIG. 1A. Updating of the first memory image 172 using, for example, a device management server such as the DM server 109 of FIG. 1A may be enabled by processing the first memory image 172 to produce a second memory image 174 arranged as a plurality of memory blocks that are decompressible. The term "independently decompressible" is used herein to mean that one memory block may be decompressed without decompressing another memory block. A first or original version of a memory image produced in this manner may be processed along with a second or updated version of the memory image by a tool known herein as a generator, which may correspond to the generator described herein, to produce update information for updating memory in an electronic device such as the electronic device 107 of FIG. 1A By arranging the second memory image 174 as a plurality of independently decompressible blocks of memory using a representative embodiment of the present invention, later updating of memory in an electronic device such as, for example, the NVM 111 of the electronic device 107 of FIG. 1A, is made more efficient, and the size of the update information produced by a generator of update information and used to update the electronic device 107, is made more compact. Details of a process that uses a first memory image to produce such a second memory image are provided below.

Figure 2:
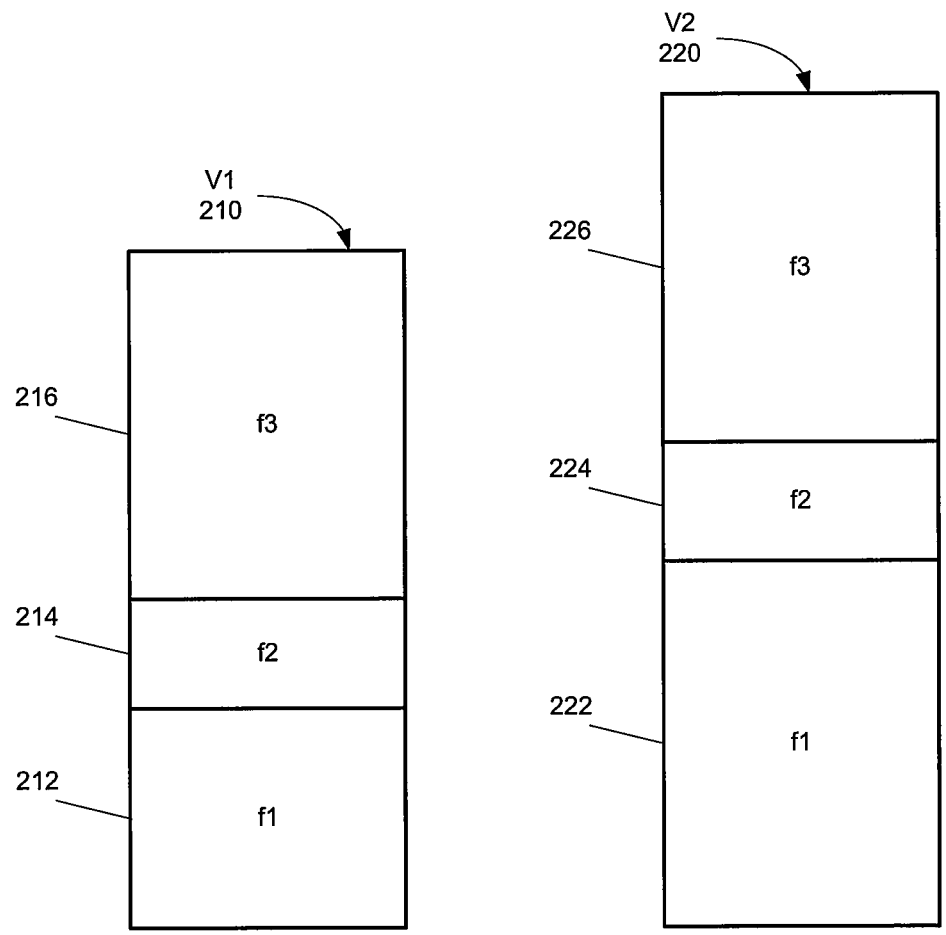
FIG. 2 is a block diagram of an exemplary file system in which a representative embodiment of the present invention may be practiced.

FIG. 2 is a block diagram of an exemplary file system in which a representative embodiment of the present invention may be practiced. The left side of FIG. 2 illustrates an exemplary "original" version V1 210 of a file system with three files f1 212, f2 214, f3 216, while the right side of FIG. 2 illustrates an exemplary "new" version V2 220 of the file system. As illustrated in FIG. 2, the files f2 214, 224 and f3 216, 226 are unchanged, but are moved up in memory to accommodate bytes added to the end of file f1 212 shown as f1 222.

One approach to update a read-only file system (ROFS) is to have the UA create an entire new file system image holding all of the files in version V2, and the write it to flash memory. This may be overly time consuming, if only a small part of the file system has changed.

To provide fault tolerance, an electronic device may keep a copy of version V1 210 available until version V2 220 is safely written to non-volatile memory. Unfortunately, there is normally not enough room in flash memory of embedded devices to allow this.

A representative embodiment of the present invention provides a method to efficiently update files in-place. The term "in-place" may be used to mean that the UA gradually overwrites version V1 210 with version V2 220, while still being fault tolerant. Also, a method in accordance with a representative embodiment of the present invention does not involve recreating parts of the flash memory that don't change. The method deals with complications arising from compression, which is often used with read-only file systems.

In a representative embodiment of the present invention, the generator and UA have interface layers that decompress and compress each flash memory block when it is read and written, respectively. The bulk of the generator and UA can be unaware of the use of compression, and can be similar to a generator/UA used for regular firmware updates (i.e., updates of non-compressed files). To simplify the update process and make the UP smaller, the firmware may be compressed so that each flash block may be decompressed and compressed independently, i.e., without reference to other flash blocks.

In some representative embodiments of the present invention, each flash memory block for compressed firmware comprises a single, contiguous region of compressed data. The region of compressed data may be followed by a region of padding bytes up to the flash memory block boundary. In contrast, each flash memory block for a compressed ROFS can potentially have many independent regions of compressed data, which can be separated by non-compressed data or by padding bytes.

Figure 3:
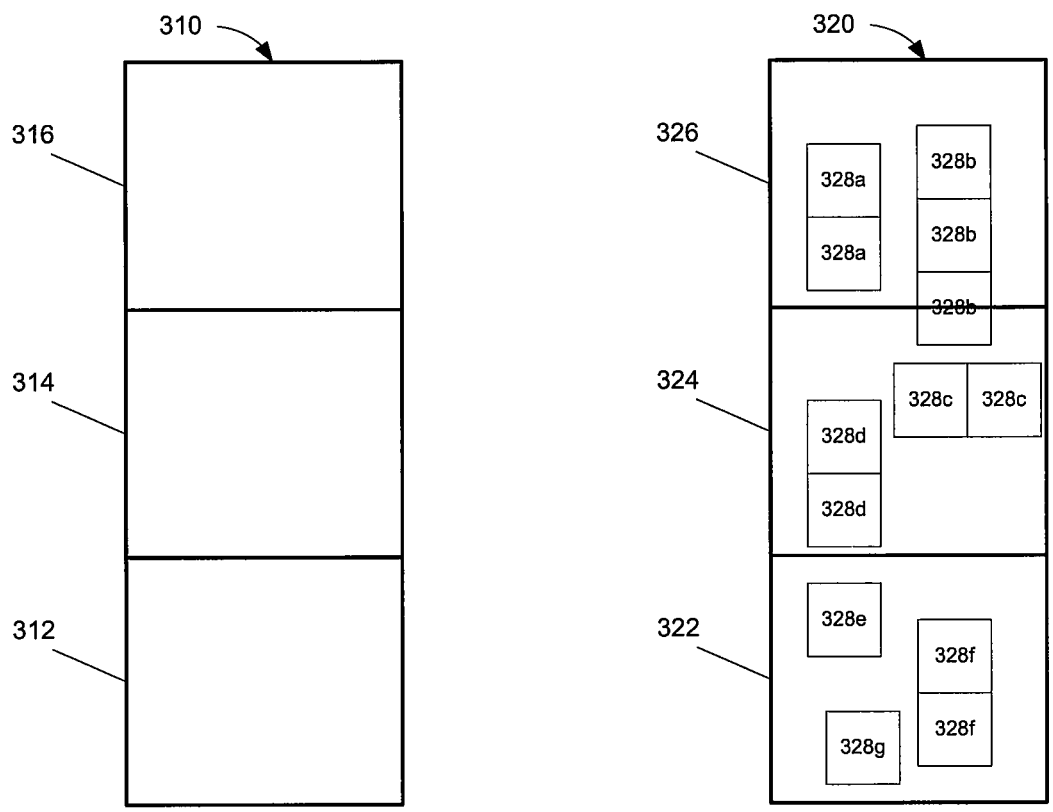
FIG. 3 shows a block diagram illustrating an exemplary compressed firmware memory layout on the left, and an exemplary compressed file system memory layout on the right, in accordance with a representative embodiment of the present invention.

FIG. 3 shows a block diagram illustrating an exemplary compressed firmware memory layout 310 on the left, and an exemplary compressed file system memory layout 320 on the right, in accordance with a representative embodiment of the present invention. The left side of FIG. 3 shows three flash memory blocks 312, 314, 316 containing compressed firmware. Each flash memory block of the compressed firmware contains a single region of compressed data. The right side of FIG. 3 shows three flash memory blocks 322, 324, 326 containing parts of a compressed ROFS. Each flash memory block of the compressed ROFS contains several independent regions 328a through 328g of compressed data that may be separated by uncompressed data. Each compressed or uncompressed region of a ROFS may be referred to as a "sub-block". The more complicated structure of compressed ROFS flash memory blocks as compared to blocks holding compressed firmware causes the interface layers that compress and decompress each flash memory block to be more complicated than those for handling compressed firmware. For example, if a flash memory block contain the following three sub-blocks:

1. a compressed sub-block A,
2. an uncompressed sub-block B,
3. another compressed sub-block C, then the decompression function may determine where these sub-blocks begin and end. Then, in an output buffer, the decompression function may put the following:

1. the decompressed version of sub-block A, immediately followed by
2. the uncompressed sub-block B, immediately followed by
3. the decompressed version of sub-block C.

Figure 4:
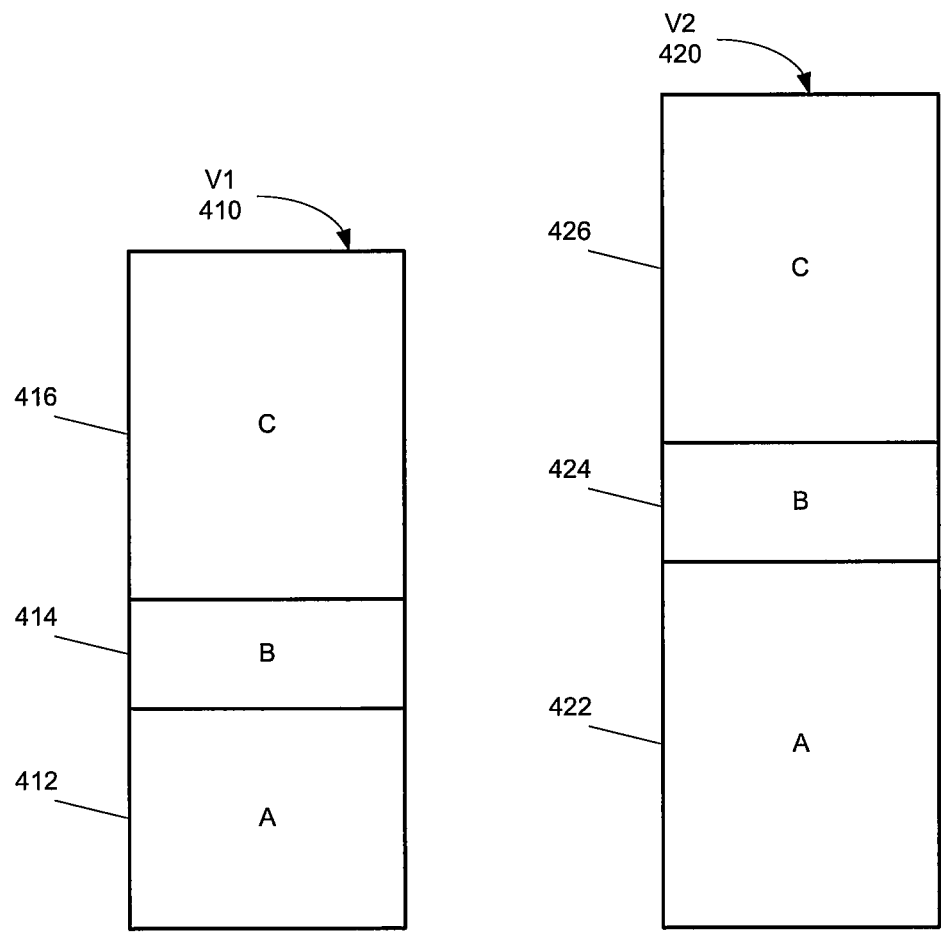
FIG. 4 shows a block diagram illustrating an exemplary compressed flash memory block on the left, and a decompressed version on the right, in accordance with a representative embodiment of the present invention.

FIG. 4 shows a block diagram illustrating an exemplary compressed flash memory block V1 410 on the left, and a decompressed version V2 420 on the right, in accordance with a representative embodiment of the present invention. As can be seen in the illustration of FIG. 4, sub-blocks A 412 and C 416 increase in size when decompressed to form sub-blocks A 422 and C 426, respectively. Sub-block B 414 is simply copied to form sub-block B 424. A compression function to reverse this decompression process is not as straightforward, and is described below.

A representative embodiment of the present invention makes specific accommodations for compressed ROFS images that are not involved in compressed firmware updates. In the following discussion, the output of the decompression function applied to a flash memory block will be referred to as the "expanded version" of the flash memory block. In addition, the compression algorithm used for each compressed sub-block will be referred to as the "underlying compression algorithm". For example, in some representative embodiments of the present invention, the underlying compression algorithm might be a compression algorithm such as used by, for example, "zlib", created by Jean-loup Gailly and Mark Adler (see http://www.zlib.net).

The compression function in a representative embodiment of the present invention employs "structure data" to operate. The sequence of bytes corresponding to an expanded version V2 flash memory block is not sufficient to determine where the different sub-blocks begin and end. Some of the sub-blocks may be compressed, and some may simply be copied over. A representative embodiment of the present invention stores this extra information in the form of a map. This information may be referred to herein as "structure data" or "metadata", and indicates to which sub-block each byte in the expanded version belongs. For example, such a map might indicate that bytes 1 to 500 of the expanded version belong to compressed sub-block A and that bytes 501 to 530 belong to an uncompressed sub-block. Additional detail on how structure data is produced from a flash memory block is given below.

In one representative embodiment of the present invention, the generator includes in the UP the structure data for each version V2 flash memory block. A second representative embodiment of the present invention, however, produces smaller UP results. In such a representative embodiment of the present invention, the UA creates structure data in the following manner:

a) Produce structure data for the original version V1 flash memory block. This is discussed further below.
b) Write the produced structure data in a standard format at the beginning of the expanded version of the flash memory block.
c) Update this written structure data to version V2 using information that the generator puts in the update package. This can use the delta compression that the UA uses.

A smaller UP is produced by the second representative embodiment of the present invention because the version V1 and version V2 structure data is most likely similar, resulting in a compact encoding in step (c).

A representative embodiment of the present invention uses a parsing/decompression function for flash memory blocks, which may be referenced by a function call such as, for example, "blockcomp_decompress( )". In a representative embodiment, such a parsing/decompression function operates by advancing a pointer through the bytes of the flash memory block, creating different kinds of sub-blocks depending on the values of the bytes located at the flash memory location identified by the pointer. If the bytes beginning at the flash memory location identified by the pointer are a header that the underlying compression program put in, then the parsing function determines whether the following data is decompressible. If the following data is decompressible, the parsing/decompression function creates a decompressed sub-block with that decompressed data. If, instead, the bytes beginning at the location identified by the pointer are part of a region filled with a single value, then the parsing/decompression function of one embodiment of the present invention creates a gap sub-block that records the size of the region, but not its bytes. Otherwise, such a representative embodiment of the parsing/decompression function creates a raw sub-block that contains the bytes themselves. The parsing/decompression function then advances the pointer in the flash memory block to the end of the data that corresponds to the sub-block, and repeats the process.

A representative embodiment of the present invention determines whether a sub-block that can be decompressed, should be decompressed. In a representative embodiment of the present invention, the generator determines both that the sub-block is decompressible, and that the decompressed data recompresses to match the original bytes of the compressed sub-block. If the recompressed data does not match the original bytes, then that sub-block is included as a raw sub-block, rather than as a decompressed sub-block. Such a problem might occur if, for example, the generator/UA uses a more recent (underlying) compressor version than the compressor used to originally create the sub-block. In one representative embodiment of the present invention, the generator/UA's decompressor function is backward compatible with older compressor functions of the same type, although the compressor function might produce a different compressed representation.

Figure 5:
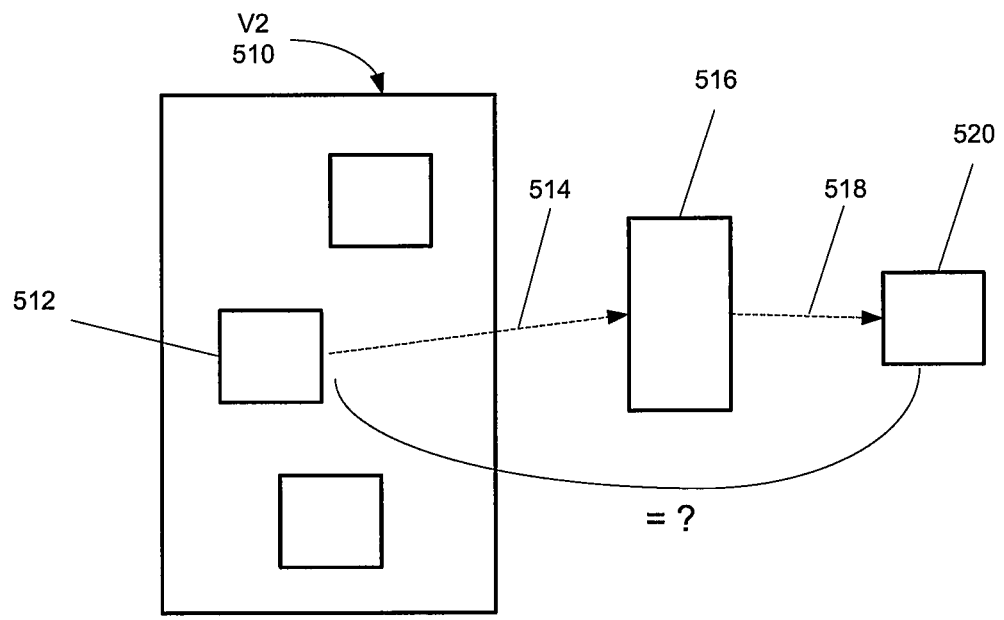
FIG. 5 shows a block diagram illustrating decompression and recompression of sub-blocks of memory, in accordance with a representative embodiment of the present invention.

FIG. 5 shows a block diagram illustrating decompression 514 and recompression 518 of sub-block 512 of memory V2 510, in accordance with a representative embodiment of the present invention. In a representative embodiment of the present invention, the decompression 514 and recompression 518 of a sub-block 512 produces a copy 520 of the original version of the sub-block 512. In some representative embodiments of the present invention, the UA runs the same test. This approach may, however, slow the expansion process. To provide faster processing, some representative embodiments of the present invention include additional information in the UP to flag each decompressed sub-block that cannot be re-compressed and match the original block contents. In such embodiments, the UA checks for a flag before trying to decompress each sub-block.

Some representative embodiments of the present invention employ "per-file preprocessing". In per-file preprocessing, each executable file in a compressed file system is preprocessed with a method similar to that used for firmware, and the information used to preprocess it (e.g., a nodelist and filters) may be stored separately in the UP. In one representative embodiment of the present invention, the generator uses information about where pairs of corresponding files are located in version V1 and version V2. This information may reside in a structure that may be referred to herein as the "rofsmap". In a representative embodiment of the present invention, the rofsmap is generated by parsing the file-system structure and associating each file in version V2 with a corresponding file in version V1. In one representative embodiment of the present invention, a file in version V2 can be associated with a file in version V1 that has the same name. Such a file does not always exist such as, for example, in the case of files that have been added in version V2. Other representative embodiments of the present invention employ different matching criteria.

The rofsmap in a representative embodiment of the present invention may be less detailed than the structure data described above, but it associates data in version V1 with data in version V2, which the exemplary structure data described above may not do. The UA uses the rofsmap to determine which preprocessor information to use for each copy, so the rofsmap is encoded in the UP. In some representative embodiments of the present invention, the UP also contains certain preprocessing information (e.g., a global nodelist) that is shared for all of the files. The generator and UA of such embodiments use this preprocessing information to predict pointers to prelinked global symbols in executable and link format (ELF) files. A representative embodiment of the present invention can employ the global nodelist in additional ways.

A representative embodiment of the present invention enables the creation and use of independently decompressible flash memory blocks. Such limitations require that each flash block be independently decompressible, and present a problem because with many compression methods, decompression cannot start from arbitrary points in the compressed stream. Compressed sub-blocks that cross a block boundary between a first block of flash memory and a second block of flash memory (i.e., "crossing sub-blocks") may not be decompressible if the first block of flash memory is not available.

In one representative embodiment of the present invention, a ROFS image is processed by, for example, a software program, to produce a new image. The new image is then stored into flash memory. The software program adjusts each crossing sub-block, as needed, so that the sub-block is decompressible from the flash block boundary, allowing the update to proceed. The program also preserves the decompressibility of the crossing sub-blocks, which allows, for example, an unmodified file system driver in the operating system (OS) of an embedded device to still read the crossing sub-blocks.

Figure 6:
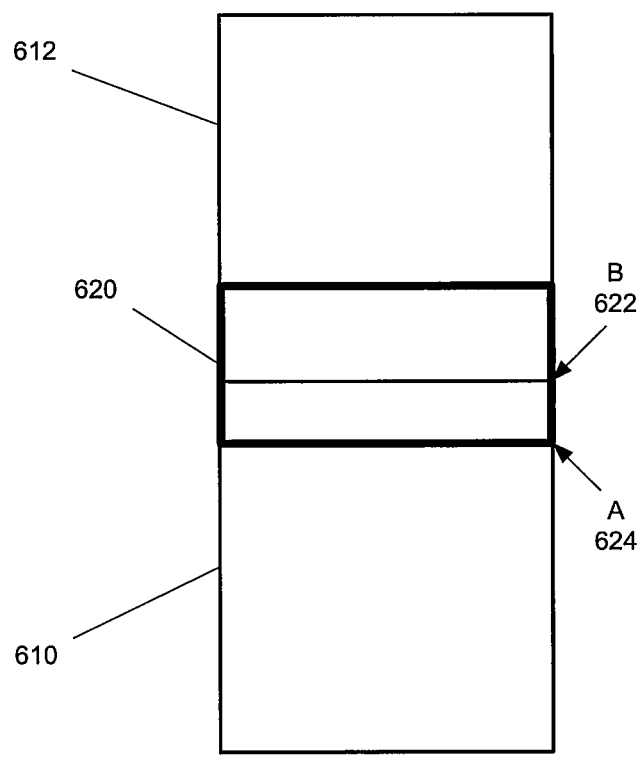
FIG. 6 shows a block diagram illustrating exemplary operation of the software program used for processing ROFS images described above for a single flash memory block, in accordance with a representative embodiment of the present invention.

FIG. 6 shows a block diagram illustrating exemplary operation of the software program used for processing ROFS images described above for a single flash memory block, in accordance with a representative embodiment of the present invention. A representative embodiment of the present invention produces a crossing sub-block 620 that is decompressible both from its beginning (A 624), and from where it crosses a flash block boundary (B 622) between flash memory blocks 610 and 612. The method used for adjusting crossing sub-blocks depends on the underlying compression algorithm. For example, in one representative embodiment of the present invention that can be used with an "LZ77"-type compressor, this is done by partitioning the raw data for the crossing sub-block into three parts—s1, s2 and s2, and compressing them differently.

Figure 7:
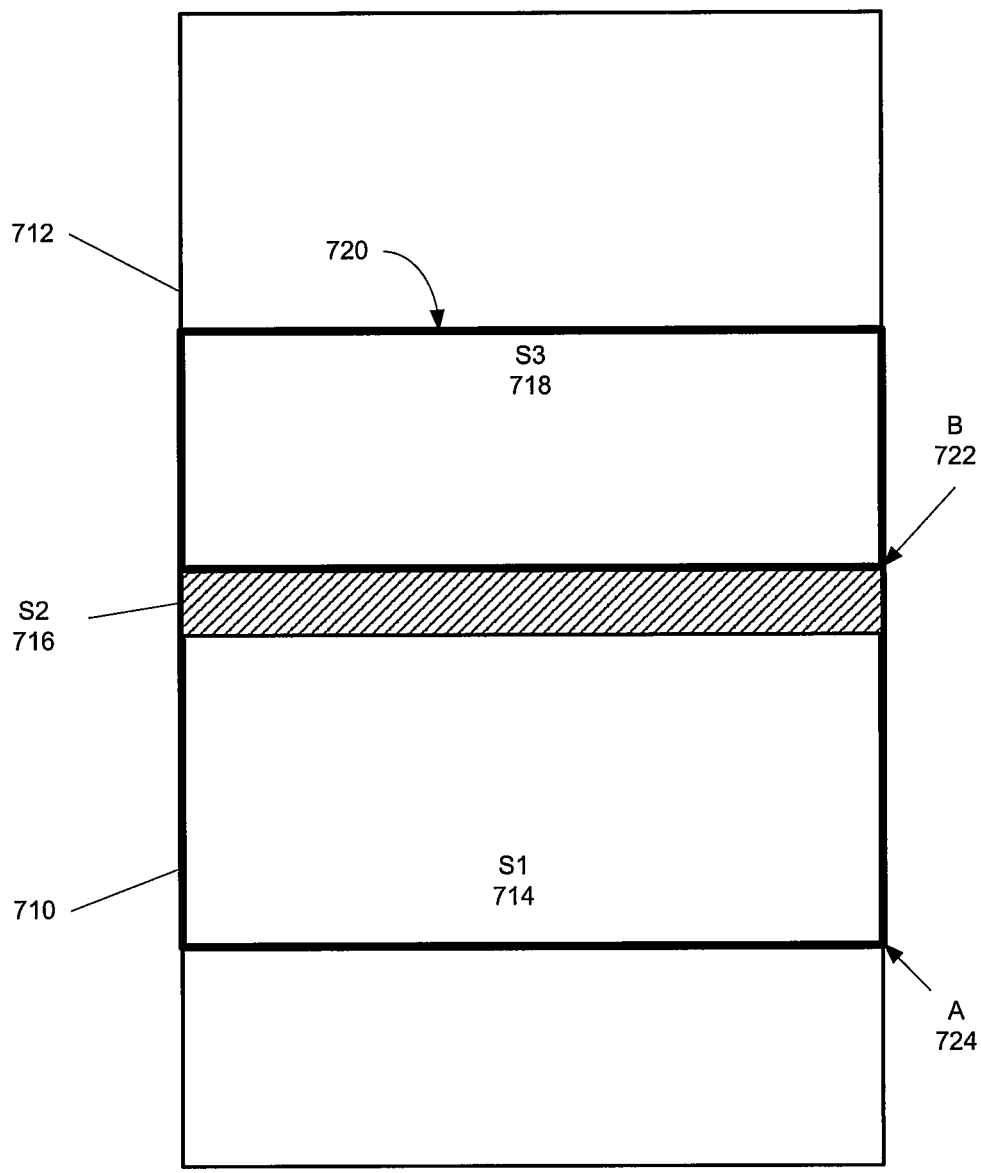
FIG. 7 shows a block diagram illustrating exemplary operation of the software program used for processing ROFS images, in accordance with a representative embodiment of the present invention.

FIG. 7 shows a block diagram illustrating exemplary operation of the software program used for processing ROFS images, in accordance with a representative embodiment of the present invention. The illustration of FIG. 7 shows adjoining flash blocks 710, 712 and crossing sub-block 720. In accordance with one representative embodiment of the present invention, part s1 714 is compressed with the LZ77 compressor, part s2 716 is not compressed at all, and part s3 718 is compressed with the LZ77 compressor, but without references back to part s1 714 or part s2 716. The size of part s1 714 is chosen so that its compressed representation stops just short of the flash block boundary B 722. The size of part s2 716 is chosen so that it fills the remaining space from the end of part s1 714 to the flash block boundary B 722. The size of s3 718 is selected to receive whatever is left over of the crossing block 720. This approach is transparent to the LZ77 decompressor, which reads and decompresses all three parts of the compressed blocks seamlessly, or otherwise to start decompressing from the flash boundary B 722. If a crossing sub-block such as crossing sub-block 720 spans more than one flash block boundary, such as flash block boundary B 722, the software program repeats the partitioning of the crossing sub-block into an s1 part and an s2 part for each flash block that the crossing sub-block spans, except for the last one, which gets a part s3.

This handling of crossing sub-blocks affects the complexity of the parsing/decompression function "blockcomp_decompress( )", since there may be some ambiguity as to whether the flash block starts with the last part of a crossing sub-block or, for example, raw data. In one representative embodiment of the present invention, the software program inserts a special marker at the end of each crossing sub-block so that, upon detecting this special marker, the parsing/decompression function "blockcomp_decompress( )" can determine whether the flash block starts with the last part of a crossing sub-block.

In a representative embodiment of the present invention, smaller UPs are produced by storing files in the same order in both version V1 and version V2. An element such as the "order manager" described above handles cases where there is no cycle of dependencies between the flash blocks being updated. A cycle of dependencies as defined herein exists if a flash block A depends on material from a flash block B, flash block B depends on material from flash block C, and flash block C depends on material from flash block A. In a representative embodiment of the present invention, an element such as the "order manager" reduces destruction of material in flash memory blocks, and may put files in the same order in version V1 or version V2 to reduce the amount of data in these cycles of dependency. Cycles of dependency within the parts of a particular file may also be handled by the "order manager".

Figure 8:
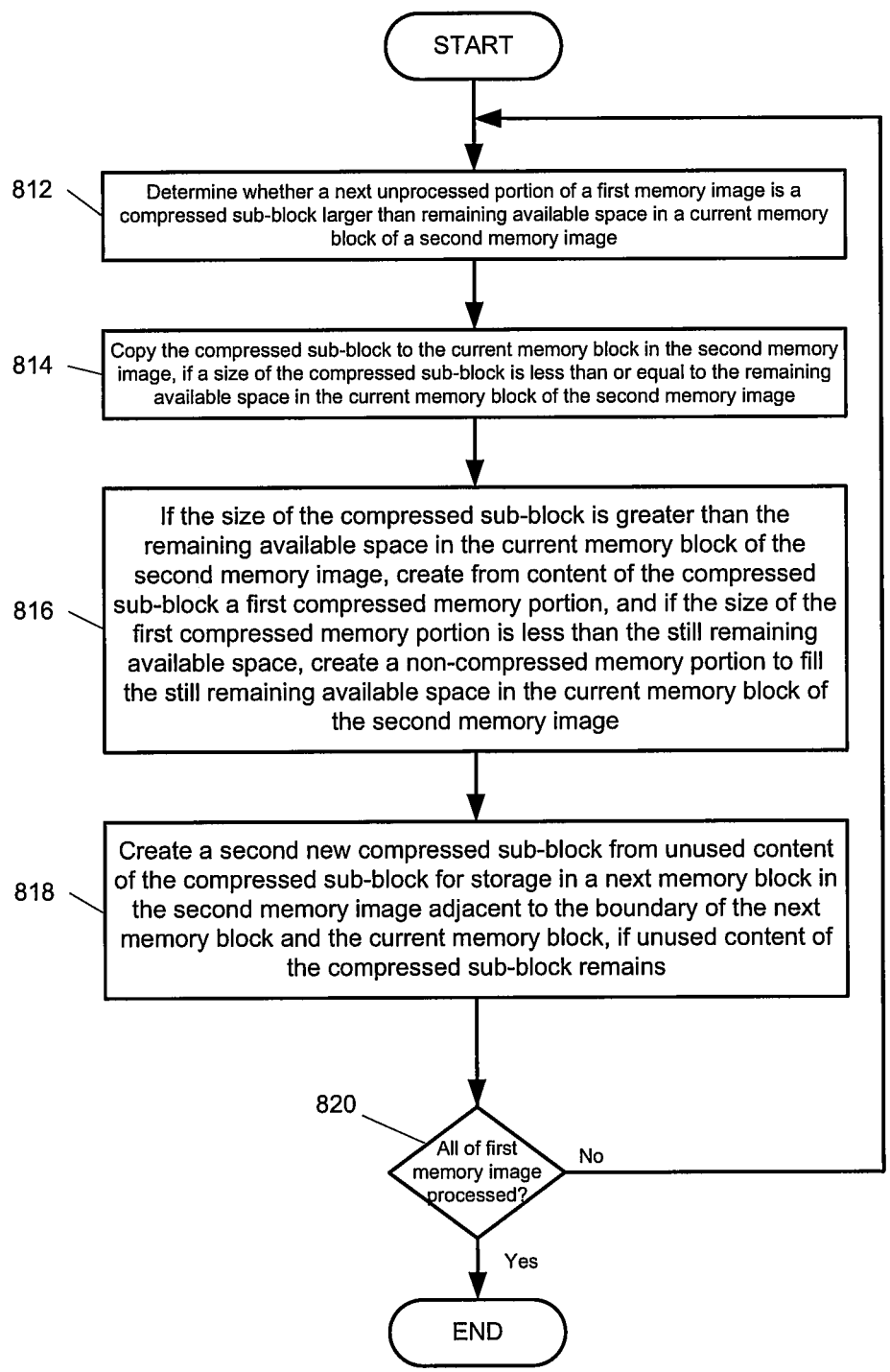
FIG. 8 shows a flowchart for an exemplary method of processing a first memory image comprising a plurality of compressed sub-blocks and uncompressed sub-blocks to produce a second memory image comprising contents of the first memory image arranged as a plurality of memory blocks, in accordance with a representative embodiment of the present invention.

FIG. 8 shows a flowchart for an exemplary method of processing a first memory image comprising a plurality of compressed sub-blocks and uncompressed sub-blocks to produce a second memory image comprising contents of the first memory image arranged as a plurality of memory blocks, in accordance with a representative embodiment of the present invention. As an aid to understanding, the following description makes reference to the elements of FIGS. 1A, 1B, 3, and 7.

The exemplary method illustrated in FIG. 8 first, at block 812, determines whether a next unprocessed portion of a first memory image such as, for example, the memory image 320 shown FIG. 3 is a compressed sub-block larger than remaining available space in a current memory block of a second memory image such as, for example, the memory block 710 of the memory image 700 of FIG. 7. Next, at block 814, the method copies the compressed sub-block to the current memory block 710 in the second memory image 700, if the size of the compressed sub-block is less than or equal to the remaining available space in the current memory block 710 of the second memory image 700. If, at block 816, the size of the compressed sub-block is greater than the remaining available space in the current memory block of the second memory image, the method of FIG. 8 creates from content of the compressed sub-block a first compressed memory portion, and if the size of the first compressed memory portion is less than the still remaining available space, the illustrated method creates a non-compressed memory portion to fill the still remaining available space in the current memory block of the second memory image. The method then, at block 818, creates a second compressed memory portion 718 from unused content of the compressed sub-block for storage in the next memory block 712 in the second memory image 700 adjacent to the boundary 722 of the next memory block 712 and the current memory block 710, if unused content of the compressed sub-block remains. At block 820, the method of FIG. 8 repeats (A) through (D) until all of the contents of the first memory image is processed to produce the second memory image.

Some representative embodiments of the present invention employ caching to deal with ordering problems. Such representative embodiments store into unused flash blocks the material from version V1 that is about to be overwritten. In this way, material that would otherwise be overwritten is made available for creating version V2 flash memory blocks.

One representative embodiment of the present invention uses the following method for ROFS updates:
1. Expand all the version V1 flash memory blocks to be cached.
2. Preprocess the data in all version V1 flash memory blocks to be cached.
3. Compress these using the same compression method as the compressed firmware, so that these blocks are independently decompressible.
4. Write them into the unused flash blocks.

In a representative embodiment of the present invention, the compressed blocks in step (3) are more compactly encoded than the original version V1 flash memory blocks that the UA expanded in step (1). That is because compressors compress entire flash blocks of data better than they compress small sub-blocks. This allows for more cached material.

Some representative embodiments of the present invention employ what may be referred to as a "sub-block table". For each decompressed sub-block, the UA in such an embodiment stores in, for example, a circular buffer its compressed and uncompressed locations in the flash memory block. The UA in a representative embodiment of the present invention accesses this structure when copying material from a previously decompressed flash memory block. The use of the sub-block table speeds up copies, because it allows decompression of a sub-block without the decompression of the sub-blocks preceding it. The sub-block table may be used most effectively when a copy of the sub-block is not available in a cache.

Some representative embodiments of the present invention may limit copying of material from the version V1. In some representative embodiments of the present invention, all of version V1 is available as a potential source of copies for parts of version V2. This, of course, involves the generator searching all of version V1, which may slow processing. In some representative embodiments of the present invention, the generator is arranged to function so that if the generator is reconstructing a particular file in version V2, and that file has a corresponding counterpart file in version V1, then the generator only examines copies that are in the counterpart file, and ignores copies that are outside of it. This greatly limits the number of copies, and speeds processing. The "counterpart file" may be determined, for example, from the rofsmap, described above. Limiting copies in this manner has little affect on UP size, because copies from outside the counterpart file can be expected to be not very long, and encoding the locations of the copies is easier if they're clustered together.

Some representative embodiments of the present invention use fast translation table lookups during preprocessing. In the course of preprocessing, it is often useful to determine whether a particular pointer falls in a valid region of the memory of the embedded device. Some representative embodiments of the present invention speeding this up by having the UA build an array that is indexed by the high-order bits of each pointer. Each element in the array may take one of three values that may be represented as "HIT", "MISS", and "PENDING". The "HIT" or "MISS" may mean that that pointer is definitely or definitely not, respectively, in a valid region of memory. The "PENDING" may mean that it's impossible to tell from the pointer's high-order bits, and a more-detailed search (e.g., using other data structures) is involved to resolve this uncertainty.

Aspects of the present invention may be found in a method of processing a first memory image comprising a plurality of compressed sub-blocks and uncompressed sub-blocks to produce a second memory image comprising contents of the first memory image arranged as a plurality of memory blocks. Such a method may comprise A) determining whether a next unprocessed portion of the first memory image is a compressed sub-block larger than remaining available space in a current memory block of the second memory image. The method may also comprise B) copying the compressed sub-block to the current memory block in the second memory image, if a size of the compressed sub-block is less than or equal to the remaining available space in the current memory block of the second memory image. In addition, the method may comprise C) if the size of the compressed sub-block is greater than the remaining available space in the current memory block of the second memory image, creating from content of the compressed sub-block a first compressed memory portion, and if the size of the first compressed memory portion is less than the still remaining available space, creating a non-compressed memory portion to fill the still remaining available space in the current memory block of the second memory image. Further, the method may comprise D) creating a second compressed memory portion from unused content of the compressed sub-block for storage in a next memory block in the second memory image adjacent to the boundary of the next memory block and the current memory block, if unused content of the compressed sub-block remains. Such a method may E) repeat (A) through (D) until all of the contents of the first memory image is processed to produce the second memory image, and the memory blocks of the second memory image may be independently decompressible.

In a representative embodiment of the present invention, the first compressed memory portion may be larger than the non-compressed memory portion, and the non-compressed memory portion is adjacent to a boundary between the current memory block and the next memory block of the second memory image. The first compressed memory portion and second compressed memory portion may be compressed sub-blocks, and the non-compressed memory portion may be a non-compressed sub-block. Each of the compressed sub-blocks and the non-compressed sub-blocks may comprise a header portion and a data portion, and the first memory image comprises a read-only file system.

Additional aspects of the present invention may be seen in a computer-readable memory device having stored therein a plurality of instructions for causing a processor to perform the method described above.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, a representative embodiment of the present invention may be realized in hardware, software, or a combination of hardware and software. Representative embodiments of the present invention may be realized in a centralized fashion in at least one computer system or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

A representative embodiment of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation or material to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A method of processing a first memory image comprising a plurality of compressed sub-blocks and uncompressed sub-blocks to produce a second memory image comprising contents of the first memory image arranged as a plurality of memory blocks, the method comprising:
   A) determining whether a next unprocessed portion of the first memory image is a compressed sub-block larger than remaining available space in a current memory block of the second memory image;
   B) copying the compressed sub-block to the current memory block in the second memory image, if a size of the compressed sub-block is less than or equal to the remaining available space in the current memory block of the second memory image;
   C) if the size of the compressed sub-block is greater than the remaining available space in the current memory block of the second memory image, creating from content of the compressed sub-block a first compressed memory portion, and if the size of the first compressed memory portion is less than the still remaining available space, creating a non-compressed memory portion to fill the still remaining available space in the current memory block of the second memory image;

D) creating a second compressed memory portion from unused content of the compressed sub-block for storage in a next memory block in the second memory image adjacent to the boundary of the next memory block and the current memory block, if unused content of the compressed sub-block remains;

E) repeating (A) through (D) until all of the contents of the first memory image is processed to produce the second memory image; and wherein the memory blocks of the second memory image are independently decompressible.

2. The method according to claim 1, wherein the first compressed memory portion is larger than the non-compressed memory portion, and wherein the non-compressed memory portion is adjacent to a boundary between the current memory block and the next memory block of the second memory image.

3. The method according to claim 1, wherein the first compressed memory portion and second compressed memory portion are compressed sub-blocks, and the non-compressed memory portion is a non-compressed sub-block.

4. The method according to claim 1, wherein each of the compressed sub-blocks and the non-compressed sub-blocks comprise a header portion and a data portion.

5. The method according to claim 1, wherein the first memory image comprises a read-only file system.

6. A computer-readable memory device having stored therein a plurality of instructions for causing a processor to perform a method of processing a first memory image comprising a plurality of compressed sub-blocks and uncompressed sub-blocks to produce a second memory image comprising contents of the first memory image arranged as a plurality of memory blocks, the method comprising:

A) determining whether a next unprocessed portion of the first memory image is a compressed sub-block larger than remaining available space in a current memory block of the second memory image;

B) copying the compressed sub-block to the current memory block in the second memory image, if a size of the compressed sub-block is less than or equal to the remaining available space in the current memory block of the second memory image;

C) if the size of the compressed sub-block is greater than the remaining available space in the current memory block of the second memory image, creating from content of the compressed sub-block a first compressed memory portion, and if the size of the first compressed memory portion is less than the still remaining available space, creating a non-compressed memory portion to fill the still remaining available space in the current memory block of the second memory image;

D) creating a second compressed memory portion from unused content of the compressed sub-block for storage in a next memory block in the second memory image adjacent to the boundary of the next memory block and the current memory block, if unused content of the compressed sub-block remains;

E) repeating (A) through (D) until all of the contents of the first memory image is processed to produce the second memory image; and wherein the memory blocks of the second memory image are independently decompressible.

7. The computer-readable memory device according to claim 6, wherein the first compressed memory portion is larger than the non-compressed memory portion, and wherein the non-compressed memory portion is adjacent to a boundary between the current memory block and the next memory block of the second memory image.

8. The computer-readable memory device according to claim 6, wherein the first compressed memory portion and second compressed memory portion are compressed sub-blocks, and the non-compressed memory portion is a non-compressed sub-block.

9. The computer-readable memory device according to claim 6, wherein each of the compressed sub-blocks and non-compressed sub-blocks comprise a header portion and a data portion.

10. The computer-readable memory device according to claim 6, wherein the first memory image comprises a read-only file system.

* * * * *

UNITED STATES PATENT AND TRADEMARK OFFICE
CERTIFICATE OF CORRECTION

PATENT NO. : 8,438,351 B2  
APPLICATION NO. : 12/663428  
DATED : May 7, 2013  
INVENTOR(S) : Samson Chen et al.

It is certified that error appears in the above-identified patent and that said Letters Patent is hereby corrected as shown below:

On the Title Page, Item (54) and in the Specification, Column 1, line 1, Title:

Delete "BINARY LEVEL" and insert -- BINARY-LEVEL --, therefor.

Signed and Sealed this  
Twentieth Day of August, 2013

Teresa Stanek Rea  
*Acting Director of the United States Patent and Trademark Office*